Figure 1:
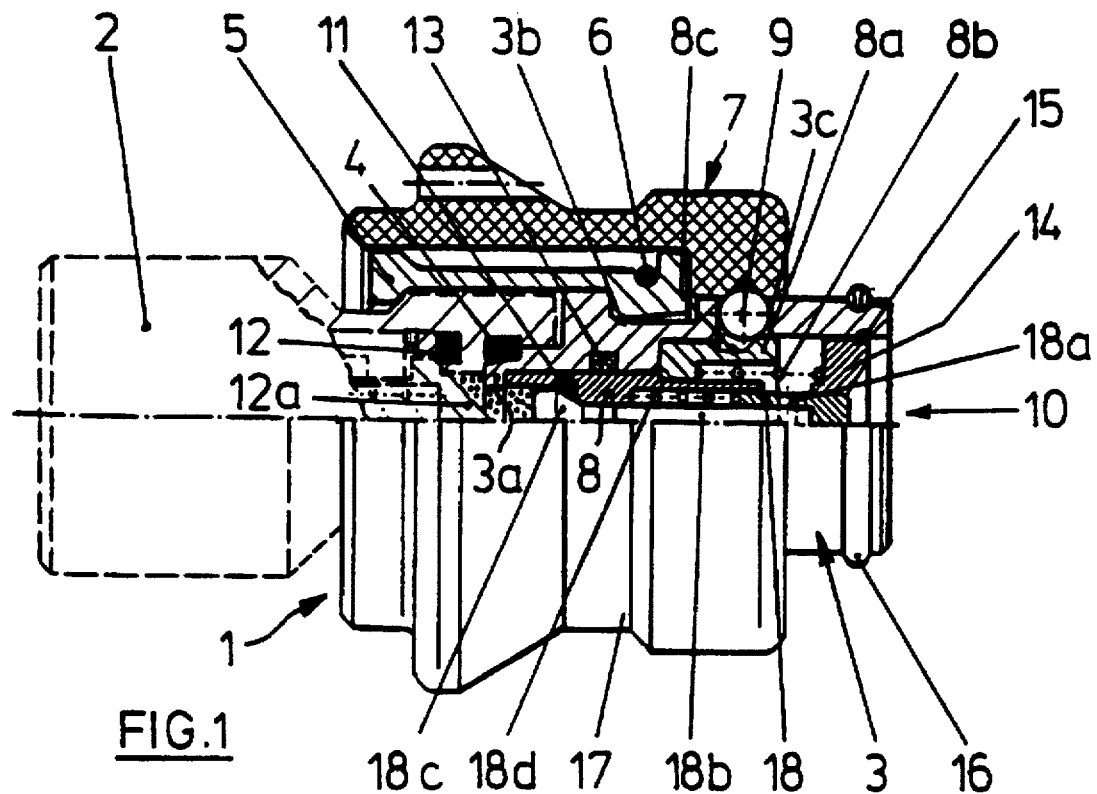

United States Patent

Weh et al.

[11] Patent Number: 5,706,967
[45] Date of Patent: Jan. 13, 1998

[54] SAFETY LOCK, ESPECIALLY FOR VEHICLE FUEL TANKS

[75] Inventors: Wolfgang Weh; Erwin Weh, both of Illertissen, Germany

[73] Assignee: Weh GmbH, Verbindung Technik, Illertissen, Germany

[21] Appl. No.: 765,100

[22] PCT Filed: Jun. 20, 1995

[86] PCT No.: PCT/EP95/02388

§ 371 Date: Dec. 20, 1996

§ 102(e) Date: Dec. 20, 1996

[87] PCT Pub. No.: WO95/35459

PCT Pub. Date: Dec. 28, 1995

[30] Foreign Application Priority Data

Jun. 20, 1994 [DE] Germany .................. 94 09 956.1 U

[51] Int. Cl.[6] .................................. B65D 45/00
[52] U.S. Cl. .................. 220/203.01; 220/316; 403/31; 403/37
[58] Field of Search ............... 220/203.01, 203.07, 220/281, 315, 316; 403/31, 36, 37, 328

[56] References Cited

U.S. PATENT DOCUMENTS

| | | | |
|---|---|---|---|
| 2,219,053 | 10/1940 | Osborn | 403/281 X |
| 3,058,760 | 10/1962 | Bankowski | 403/281 X |
| 3,122,263 | 2/1964 | Guiver | 220/316 |
| 3,128,009 | 4/1964 | Norton | 220/316 |
| 4,308,971 | 1/1982 | Straub | 220/315 |
| 4,575,136 | 3/1986 | Keller | 220/316 X |
| 4,700,866 | 10/1987 | Taylor | 220/316 |
| 4,774,983 | 10/1988 | Abe | 137/614.2 |

FOREIGN PATENT DOCUMENTS

| | | |
|---|---|---|
| 9012886 | 1/1991 | Germany . |
| 9216647 | 3/1993 | Germany . |
| 9308091 | 9/1993 | Germany . |

*Primary Examiner*—Steven M. Pollard
*Attorney, Agent, or Firm*—Knobbe, Martens, Olson & Bear, LLP

[57] ABSTRACT

In order to improve the security and ease of operation of a safety lock, especially for vehicle fuel tanks, comprising a plug (3) with a sealing section (3a) which can be fitted on the aperture of a connector nipple (2), a locking device (5), especially in the form of clamping jaws by means of which the plug (3) fitted on the connector nipple (2) can be releasably secured thereto, an actuating device (7), especially in the form of a push-on sleeve, and a vent (10) to release pressure which is connected to the connector nipple (2) in the region of the sealing section (3a). It is proposed that inside the safety lock (1) be fitted an axially movable piston (8) coupled to a locking component (9), for the actuating device (7).

11 Claims, 2 Drawing Sheets

SAFETY LOCK, ESPECIALLY FOR VEHICLE FUEL TANKS

The invention relates to a safety closure, particularly for vehicle gas tanks in accordance with the features of the preamble to Patent claim 1. Such a pressure-tight safety closure is known from DE-GM 92 16 647. This pressure-tight safety closure, which is particularly suitable for connector fittings of motor vehicle gas tanks, has a plug with an integral sealing portion insertable into the opening of the connector fitting and a locking device disposed on the outer side of the plug, particularly in the form of a collet, so that the cap-shaped safety closure set on the connector fitting, engages around said fitting. In order to enable simplified uncoupling, the safety closure also has an evacuation device, which communicates with the opening in the connector fitting in the region of the sealing portion. By means of such an evacuation device, particularly in the form of an evacuation screw or a spring-loaded evacuation valve, pressures acting on the plug-in coupling, which can for example occur due to a damaged seal of the connector fitting, can be dispersed or at least reduced, as they would render difficult or even impossible simple withdrawal of the safety closure.

This pressure-tight safety closure has proved its worth in particular as a protective cap for connector fittings on motor vehicle gas tanks and in this way it is possible reliably to prevent gas from escaping from a vehicle with a full tank thus giving rise to high explosive gas mixtures which are easy to ignite and which lead to a high safety risk particularly in underground garages.

As already indicated above, there is provided in the known pressure-tight safety closure an evacuation device in order in this way to reduce or disperse pressures in the connection region, which would render difficult simple withdrawal of the safety closure. In this connection however there is a risk that a user will forget to activate the evacuation valve in order to reduce pressure and will attempt by force to withdraw the actuating device in its preferred construction as a sliding sleeve. Stronger persons can in fact succeed in doing this even if a relatively high pressure obtains within the safety closure due to a damaged seal. Thus there is a risk that when the sliding sleeve is forcibly withdrawn and the locking device is thus unlocked, the safety closure, due to the fluid or gas pressure obtaining in the connector region will be propelled away, and thus could cause serious injury. In addition, in such connection or transitional pressures which still permit withdrawal of the sliding sleeve with the corresponding application of force, the contact surfaces of the locking device and the complementary-shaped engagement surfaces of the connector fitting are subjected to excessive stress, so that despite the fact that the collet is of a hardened construction, excessive wear on the portions of the locking device or of the connector fitting which are in contact can occur. Even the sliding sleeve preferably provided as an actuating device in this case is subjected to increased wear.

Accordingly the object underlying the invention is to improve a safety closure of the type in question as regards safety and ease of use.

This object is achieved by a safety closure with the features of claim 1.

By means of the piston which is axially movable guided in the interior of the safety closure, in cooperation with a locking member, preferably a locking ball, locking of the actuating device, particularly the sliding sleeve, is achieved, so that even when there is a relatively low pressure still acting on the coupling of e.g. 6 to 8 bar, upon the occurrence of leaking gas in the connector region of the connector fitting, actuation and thus withdrawal of the safety closure is prevented in a positive-locking and thus reliable manner. This response pressure of the locking member may be set and defined in a simple way to a pressure which is of no danger by the selection of a spring acting contrary to the movement of the piston. Due to the positive-locking closure by means of the locking member, the user is forced to use the evacuating device for pressure reduction in every case, when locking of the actuating member occurs due to a pressure above the defined and safe pressure, so that safety in use is totally guaranteed. Due to the possibility thus afforded of a totally reliable locking of the actuating device starting from a defined connection or leakage gas pressure acting on the safety closure, the actuating device in all may be of a simpler and lighter construction. Thus for example the sliding sleeve preferably provided may be constructed entirely as injection-molded plastics part without the necessity of providing metal inserts for security against excessive applications of actuating force.

A further advantage is that due to the axial displacing movement of the piston an indicator bolt can be provided to display the connection or leakage gas pressure obtaining in the connection region, so that the user is informed for example of the occurrence of wear at the seals of the connector fitting. This indicator is preferably simultaneously provided as a press-button for the evacuation valve, so that particular simplicity of use results.

Further advantageous developments form the subject matter of the sub-claims.

Figure 2:
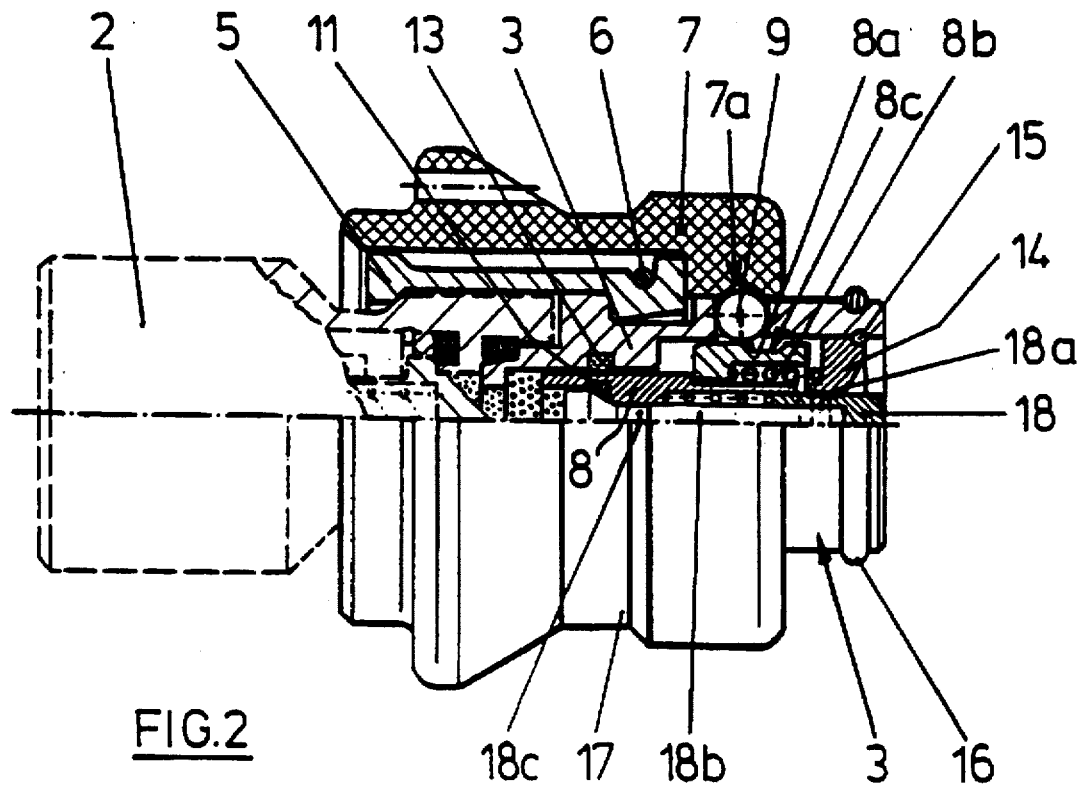
Figure 3:
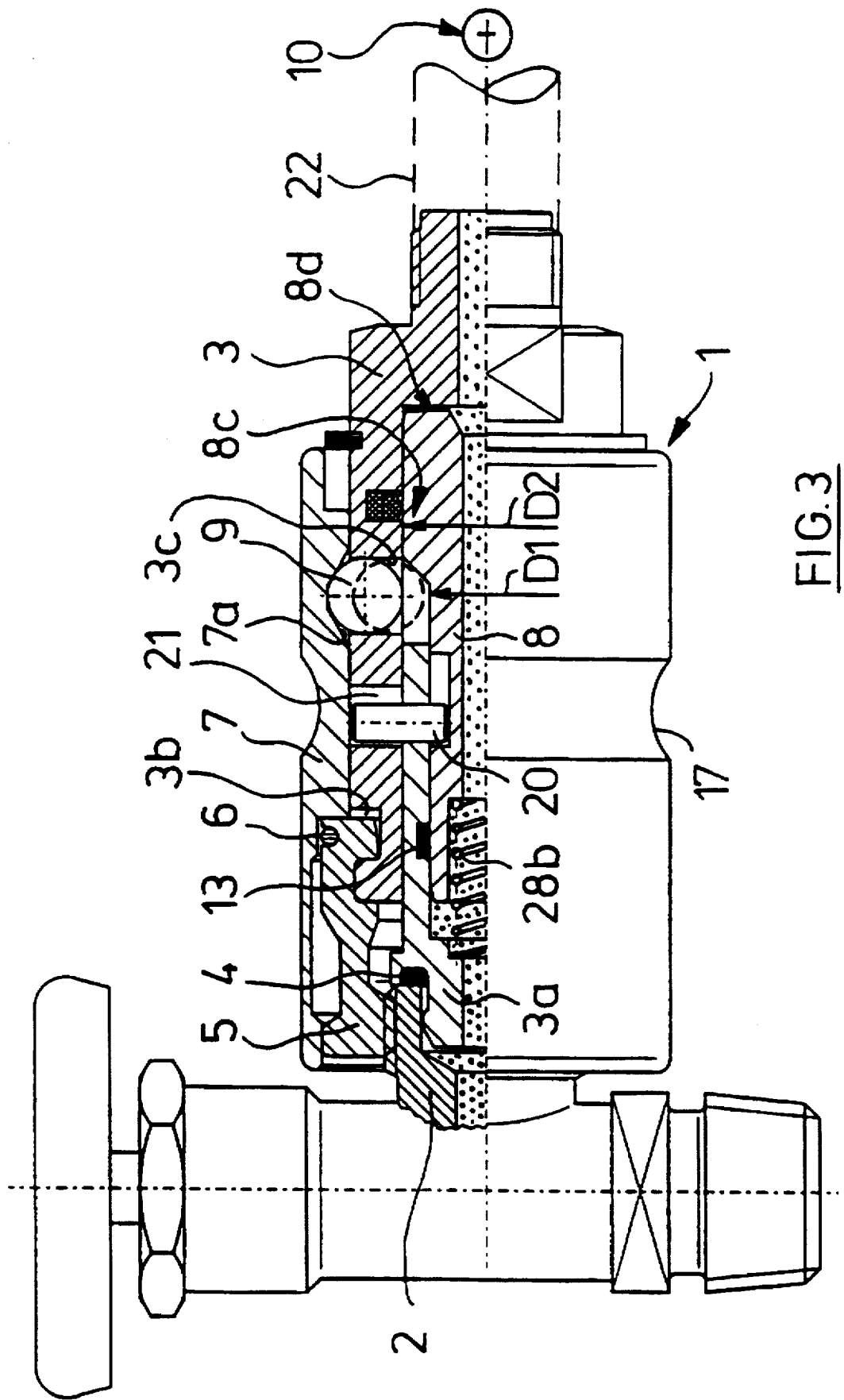

The invention will be explained and described in more detail in the following with reference to two embodiments given by way of example and illustrated in the drawing, which shows:

FIG. 1: a preferred embodiment of a pressure-tight safety closure in half-section in a position permitting activation and unlocking;

FIG. 2: the safety closure according to FIG. 1, but in a position locking the activation in the case of an excessive pressure of leakage gas; and FIG. 3: a variant embodiment with a fluid supply line.

FIG. 1 shows a pressure-tight safety closure 1 in half-section, which can be connected to a connector fitting 2 of a motor vehicle gas tank. The safety closure 1 has a substantially sleeve-shaped plug 3, the forward sealing portion 3a of which can be inserted into a fitting opening shown in dashed lines of the connector fitting 2. The connector fitting 2 is also shown in partial section for clarity and has, facing the sealing portion 3a of the plug 3, a seal 4. The seal 4 however can also be disposed as a supplement or alternative on the sealing portion 3a. In addition, in the interior of the connector fitting 2 for safety reasons a further seal 12 is provided, said seal 12 cooperating with a conical spring-loaded valve 12a.

Provided on the outer circumferential side of the plug 3 is a locking device 5, by means of which the safety closure 1 mounted on the connector fitting 2 may be positively and releasably connected. The locking device 5 is preferably formed by a collet, which engages with a frontal bead around the connector fitting 2 and at its end, here on the right, is pivotally mounted at a bearing point, particularly a recess 3b on the outer surface of the plug 3. The collet of the locking device 5 is in this case under spring bias in the spread direction on this bearing point by means of an annular spring 6. It should be noted that, instead of the collet shown here, balls or similar locking members can be provided for releasable connection of the safety closure 1 to the connector fitting 2.

Unlocking or locking of the locking device 5 is effected by means of an actuating device 7 here in the shape of a sleeve or sliding sleeve. For this purpose, there is provided on the outer side of the actuating device 7 at least one surrounding groove 17, upon which the actuating device 7 may be engaged and in this case can be drawn to the right hand side. In this way when the forward, thickened ends of the collet are released and can spread outward in the radial direction due to the action of the annular spring 6, so that the safety closure 1 can be withdrawn from the connector fitting 2. Connection of course is effected in the reverse order as this is basically also described in DE-GM 92 16 647.

A factor of substantial importance is the piston 8 which is axially movably and centrally mounted in the plug 3, said piston 8 communicating through an associated ring 8a with a locking member 9. This locking member 9 is mounted in one (or more) transverse bore(s) 3c inside the plug 3 and is movable in the radial direction. It should be noted that instead of the spherical shape selected here, radially movable bolts or pins can also serve as a locking member 9. In this case the ring 8a is acted upon by a compression spring 8b in the direction of the connector fitting 2 so that the ring 8a and the piston 8 are stopped against corresponding projections within the plug 3. The method of operation of the piston 8 and of the locking member 9 will be explained in more detail below in connection with FIG. 2.

In addition, there is provided within the piston 8 an evacuation device 10, which is substantially bolt-shaped and sealed off from the piston 8 by means of a seal 11. Thus if, due to damage to the seal 12 or clamping of the seal ball 12a, gas enters the connector area (indicated in dotted lines), further emergence out of the safety closure 1 is prevented by the seals 4 and 11. The evacuation device 10, however, can be actuated for evacuation by axial pressure, so that the seal at seal 11 is released and thus leakage gas can emerge through the parts which are assembled with a degree of clearance. For this purpose the evacuation device 10 is preferably fitted with a press-button 18, which is connected by a transverse pin 18a to a central seal bolt 18b, whose widened end 18c abuts on the seal 11. Thus by means of a spring 18d the bolt 18b is actuated in an outward direction, so that the sealing portion 18c abuts on the seal 11.

The piston 8 is further sealed off by means of a seal 13 from the plug 3, so that even in the case of a displacement movement shown in FIG. 2, leakage gas cannot emerge between the plug 3 and the piston 8, except if the evacuation device 10 has been actuated. The press-button 18 of the evacuation device 10 is further guided in a securing ring 14, which is secured by means of a snap ring 15 in the plug 3, and in addition serves to support the spring 8b acting on the piston 8. There is also disposed on the outer side of the plug 3 a ring 16, which serves as a support for ring and middle finger, when the press button 18 is actuated by the thumb.

The safety closure according to FIG. 1 is shown in FIG. 2, yet in a position locking the actuation of the actuating device 7 for the case for example in which, due to a damaged seal 12, an excess pressure should obtain in the interior of the safety closure 1. This leakage gas pressure (shown in dotted lines) in this case displaces the piston 8 sealed off by the seals 11 and 13 against the action of spring 8b to the right, so that the locking member 9 is pushed radially outward, the locking ball preferably provided here engaging in a groove 7a of the actuating device 7. As a variant from the position in FIG. 1 it should be noted that the locking member 9 itself cannot be pressed radially inwards with the application of great force, as it is prevented by the annular control surface 8c on the ring 8a associated with the piston 8 from being pushed inwards. Contrary to this, it is possible in the position according to FIG. 1 for the locking ball to be forced radially inwards when traction is exerted on the actuating device 7, as the ring 8 can be displaced slightly to the right against the pressure of spring 8b and thus the locking ball 9 drops into the groove-shaped control surface 8c. It should be noted that instead of the groove-shaped control surface 8c in this case, a cone or the like may be provided. The essential feature is however that there is provided on the piston 8 or on the ring 8a provided here for assembly reasons and associated with the piston 8, a control surface 8c, which secures the locking member 9 positively in the actuating device 7, as shown in FIG. 2. Only after actuation of the evacuation device 10 and thus pressure release in the dotted region, does the piston 8 revert into the position according to FIG. 1 due to the pressure of the spring 8b, so that the locking member 9 again becomes movable in the radial direction and can engage in the groove of the control surface 8c, so that then the actuating device 7 preferably designed as a sliding sleeve, can be withdrawn.

As FIG. 2 shows, with increased pressure the press-button 18 projects outward relative to the securing ring 14, so that this can be used as a pressure indication, color markings or other markings such as numbers being provided for example on the outer periphery of the press-button 18. At this point also the condition of wear of the internally-lying seal 12 can be read off, and steps taken for appropriate repair or servicing.

FIG. 3 shows a modified embodiment of the safety closure 1, which in this case is connected to a connector fitting 2 of a gas filling valve for gas bottles; identical components in this case provided with identical reference numerals. In this case there is in particular provided in agreement with the embodiment according to FIGS. 1 and 2 a tubular plug 3, on whose forward end facing the connector fitting 2 the locking device 5 in the form of a collet is mounted on a recess 3b. The collet 5 and the plug 3 are in this case surrounded by an actuating device 7 in the form of a sliding sleeve, which has on its outer periphery a surrounding groove 17. There is in turn formed on the inner surface of the actuating device 7 an annular groove 7a, in which there engages a locking member 9 in the form of a ball. This locking ball in this case is in turn radially movably accommodated in a transverse bore 3c of the plug 3. There is again provided on the inner peripheral surface of the plug 3 an axially movable piston 8, which is thus movable parallel to the sliding sleeve 7. The piston 8 has on its outer peripheral surface a control surface 8c, formed by varying outer diameters D1 and D2. In the position of the piston 8 shown here, the smaller diameter D1 of the control surface 8c lies opposite the locking member 9, so that this latter can pass by sliding along the transverse bore 3c in an inward direction into contact on the diameter area D1, so that the locking with the groove 7a of the actuating device 7 is released and thus the sliding sleeve in this case can be pulled to the right.

In the locked position of the safety closure 1, i.e., when a connection or leakage gas pressure is active in the interior of the safety closure, the piston 8 is in this case displaced to the left relative to the position shown here against the spring force of a compression spring, so that the greater diameter D2 of the control surface 8c presses the locking member 9 outward into positive engagement with the surrounding groove 7a. In this way the sliding sleeve 7 is locked so that withdrawal of the safety closure 1 is reliably prevented.

As a variant to the embodiment according to FIGS. 1 and 2, in this case the sealing portion 3a with seal 4 is mounted with a slight degree of axial movement relative to the plug 3 within the said plug 3, yet to a lesser extent than the possible axial movement of the piston 8. This slight axial movement of the sleeve-shaped sealing portion 3a serves to ensure that the sealing portion always reliably abuts on the connector fitting 2. The slight axial movement of the sleeve shaped sealing portion 3a is in this case limited by a transversely-extending pin 20, which is guided within a slot 21 in plug 3. The seal on the peripheral side between the sealing portion 3a and the piston 8 is in this case ensured by a seal ring 13. As a further difference, there is in this case connected at the right hand end of the plug 3 a connector line 22 shown diagrammatically, by means of which the safety closure is pressurized in order for example to supply gas under pressure at the connector fitting 2 and subsequent components connected thereto such for example as gas bottles or gas tanks. In this case the evacuation device 10 for pressure release may be disposed remotely from the safety closure. In the simplest way, the evacuation device 10 is formed by a pressure valve of a filling system now shown in further detail so that, after closure of this filling valve in the region of the sealing portion 3a, a reduced pressure obtains. During the filling procedure at increased pressure the medium to be filled also passes to a terminal piston face 8d, so that the piston is displaced in the interior of the safety closure 1 axially relative to the connector fitting 2. By means of this axial displacement movement, the piston 8 on the one hand moves into contact with the sleeve-shaped sealing portion 3a, so that the latter in addition to the seal 8 is pressed against the connector fitting 2, so that an increase in the sealing effect is obtained. Furthermore, in this way the locking ball 9 which until now has been lying in the smaller diameter D1 of the control surface 8c, is pressed outward into positive engagement with the actuating device 7, by the portion of the peripheral surface of the piston 8 with the greater diameter D2. Thus, as long as gas or fluid at increased pressure is supplied through the fluid line 22 shown in dotted lines, the actuating device 7 remains locked. Only when the pressure obtaining in the region of the sealing portion 3a is at least reduced or totally released ("evacuation position"), is the piston 8 pushed back to the right into the position shown here, with reinforcement by the compression spring 28b. By means of appropriate selection of the spring strength of the spring 28b, which corresponds substantially in its function to the compression spring 8b in FIGS. 1 and 2, thus the locking or unlocking pressure of the safety closure 1 can be precisely set, e.g., to 4 bar. Above this response pressure withdrawal of the safety closure 1 is impossible.

We claim:

1. Safety closure, particularly for vehicle gas tanks, comprising:

a plug (3) with a sealing portion (3a) mountable on the opening of a connector fitting (2);

a locking device (5), particularly in the form of a collet, by means of which the plug (3) mounted on the connector fitting (2) is releasably connectable to the connector fitting (2);

an actuating device (7), particularly in the form of a sliding sleeve; and an evacuation device (10) for pressure release, which communicates with the connector fitting (2) in the region of the sealing portion (3a);

characterized in that there is provided in the interior of the safety closure (1) an axially displaceable piston (8) which is coupled to a locking member (9) for the actuating device (7).

2. Safety closure according to claim 1, characterized in that:

the locking member (9) is formed by at least one ball, which is engageably mounted in an annular groove (7a) on the actuating device (7).

3. Safety closure according to claim 1, characterized in that:

the locking member (9) is mounted in a radially-extending bore (3c) in the plug (3).

4. Safety closure according to claim 1, characterized in that the piston (8) is urged by a pressure spring (8b) in the direction of the connector fitting (2).

5. Safety closure according to claim 4, characterized in that the pressure spring (8b) is interchangeably mounted in the safety closure (1) in order to set the locking pressure.

6. Safety closure according to claim 5, characterized in that in order to exchange the pressure spring (8b), there is provided an externally-accessible securing ring (14), which is attached by means of a securing member (15) on the plug (3).

7. Safety closure according to claim 1, characterized in that there is coupled to the piston (8) a central bolt (18b) which is movable relative to the plug (3), and this relative movement is provided as a pressure indication.

8. Safety closure according to claim 7, characterized in that the bolt (18b) is simultaneously formed as a component of the evacuation device (10).

9. Safety closure according to claim 7, characterized in that there is attached to the bolt (18b) a press-button (18) for actuating the evacuation device (10).

10. Safety closure according to claim 9, characterized in that the press-button (18) is disposed in a countersunk manner on the end face facing away from the connector fitting (2).

11. Safety closure according to claim 1, characterized in that the piston (8) has on the outer periphery a control surface (8c) with different external diameters (D1, D2), which in a first position of the piston (8) holds the locking member (9) in positive engagement with the actuating device (7) while in another position of the piston (8) the locking member (9) is disengaged from the actuating device (7).

* * * * *